Nov. 24, 1931.　　　E. E. HEWITT　　　1,832,863
CHECK VALVE SEAT
Filed Feb. 6, 1930
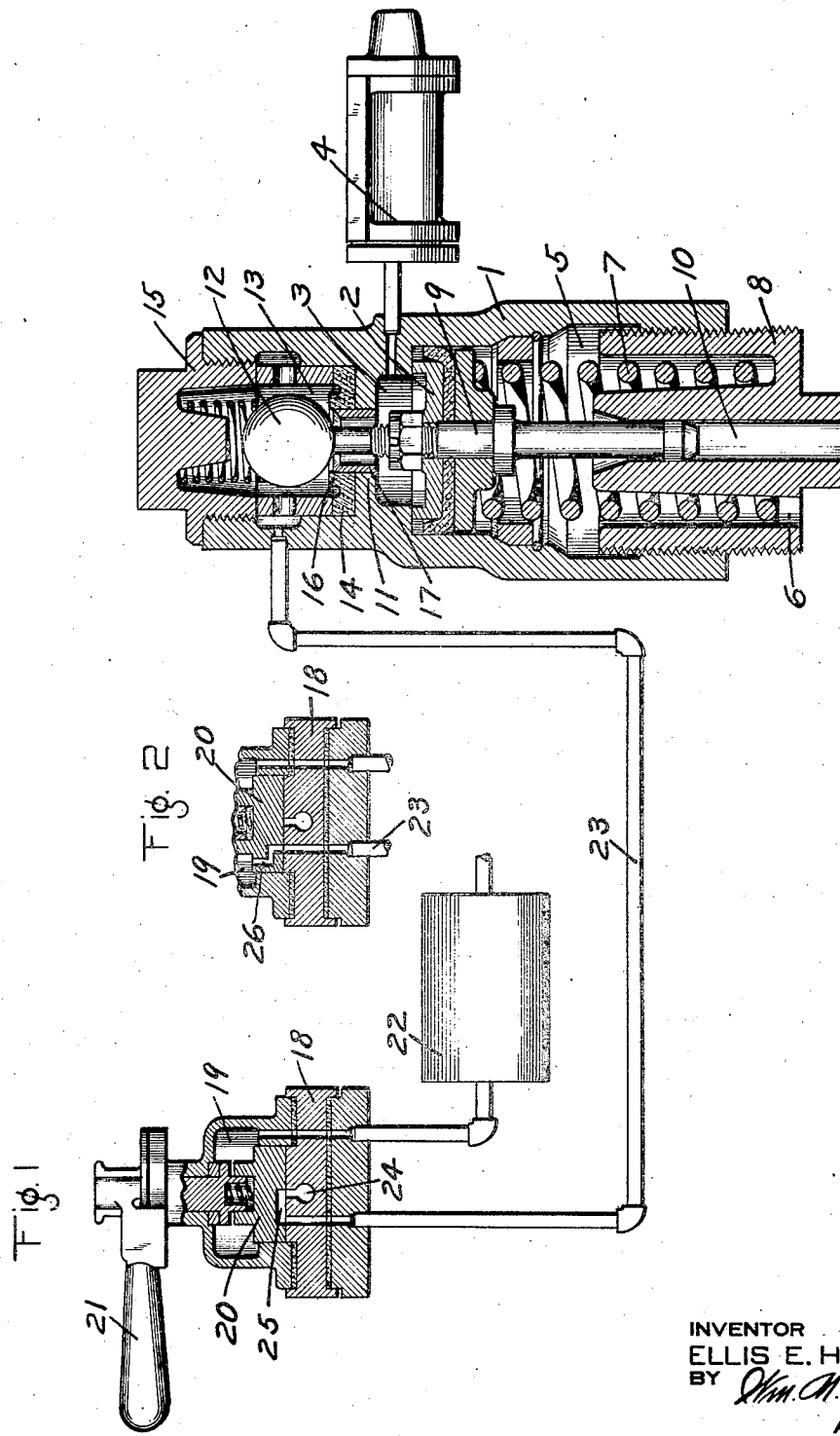
INVENTOR
ELLIS E. HEWITT
BY
ATTORNEY Patented Nov. 24, 1931

1,832,863

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

CHECK VALVE SEAT

Application filed February 6, 1930. Serial No. 426,331.

This invention relates to check valves, and more particularly to a check valve adapted for use with fluid pressure devices.

The principal object of my invention is to provide an improved seat for a check valve.

In the accompanying drawings; Fig. 1 is a diagrammatic view of a fluid pressure brake apparatus showing my improved check valve and seat associated therewith; and Fig. 2 a sectional view of the brake valve device, showing the rotary valve in brake application position.

The improved check valve and seat are shown in connection with a brake cylinder pressure limiting valve device 1, comprising a casing containing a piston 2, having the chamber 3 at one side connected to a brake cylinder 4 and having the chamber 5 at the opposite side open to the atmosphere through passage 6. Acting on piston 2 and disposed in chamber 5 is a coil spring 7, the pressure of which may be adjusted by means of a screw plug 8, having screw-threaded engagement in the casing.

The piston 2 is provided with a stem 9 which extends in opposite directions, one portion working in a bore 10 of the plug 8 to serve as a guide for the piston and the other portion extending upwardly through an opening in a partition wall 11 and adapted to engage a ball check valve 12 contained in chamber 13. Mounted at the base of chamber 13 is a resilient valve seat member 14 and said seat is clamped in place by a screw plug 15, having screw-threaded engagement in the valve casing.

The member 14 is provided with an annular seat ring 16, against which the check valve 12 is adapted to seat. In order to maintain and ensure a circular seat, a bushing 17, preferably of brass, is inserted in the port opening of the member 14, said bushing being secured in the partition wall 11. When the member 14 is clamped in place by the plug 15, said member, being resilient, is liable to be squeezed into the port opening and be deformed, so that a true circular seat for the check valve 12 will not be obtained. By employing the bushing 17, the seat ring 16 is prevented from becoming deformed.

The equipment shown, includes a brake valve device 18 having a chamber 19 containing a rotary valve 20, adapted to be operated by a handle 21. The chamber 19 is connected to a source of fluid under pressure, such as the storage reservoir 22 and a pipe 23, opening to chamber 13, leads to the seat of the rotary valve 20.

In the release position, as shown in Fig. 1, pipe 23 is connected to exhaust port 24, through cavity 25 in the rotary valve. To apply the brakes, the handle 21 is operated to rotate the valve 20 to the position shown in Fig. 2, in which pipe 23 is connected through port 26 in the rotary valve with chamber 19, so that fluid under pressure is supplied from reservoir 22 to pipe 23 and thence to chamber 13 of the pressure limiting valve device.

The check valve 12 is normally held off its seat by the stem 9 of the piston 2, so that fluid under pressure is supplied from chamber 13 to chamber 3 and thence to the brake cylinder 4. When the pressure of fluid supplied to the brake cylinder and acting on piston 2 has been increased to a degree sufficient to overcome the pressure of spring 7, the piston 2 will be moved downwardly against the pressure of spring 7. The stem 9 being then moved downwardly, the check valve 12 is permitted to seat and cut off the further supply of fluid to the brake cylinder. The pressure of fluid supplied to the brake cylinder is thus limited, according to the pressure at which the spring 7 is adjusted to act on piston 2.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

The combination with a brake cylinder, of a pressure limiting valve device comprising a check valve, a resilient seat having a port opening for said check valve, an annular bushing fitted in said port opening, a spring, and a piston subject to the opposing pressures of the brake cylinder and said spring for operating said check valve.

In testimony whereof I have hereunto set my hand, this 4th day of February, 1930.

ELLIS E. HEWITT.